United States Patent [19]

Goswami et al.

[11] Patent Number: 5,334,443
[45] Date of Patent: Aug. 2, 1994

[54] SUBSTRATE WITH ADHESION PROMOTING FILM COMPRISING VINYL CHLORIDE POLYMER PLASTICIZED WITH POLYKETONE

[75] Inventors: Jagadish C. Goswami, New City, N.Y.; Gerald R. Alessio, Emerson, N.J.

[73] Assignee: Akzo Nobel N.V., Arnhem, Netherlands

[21] Appl. No.: 845,120

[22] Filed: Mar. 3, 1992

Related U.S. Application Data

[63] Continuation-in-part of Ser. No. 595,060, Oct. 10, 1990, Pat. No. 5,109,047.

[51] Int. Cl.⁵ .................. B32B 7/00; B32B 7/12; C08K 5/07
[52] U.S. Cl. .................. 428/261; 428/344; 428/355; 524/357; 525/185
[58] Field of Search .......... 524/357; 525/185; 428/355, 260, 261, 344

[56] References Cited

U.S. PATENT DOCUMENTS

| | | | |
|---|---|---|---|
| 3,780,140 | 12/1973 | Hammer | 525/185 |
| 3,808,288 | 4/1974 | Hackhel | 260/828 |
| 3,945,876 | 3/1976 | Bianca | 156/331 |
| 4,795,773 | 1/1989 | Smutny | 524/170 |
| 4,806,414 | 2/1989 | Brouwer | 428/260 |
| 4,820,578 | 4/1989 | Danforth et al. | 428/291 |
| 4,871,618 | 10/1989 | Kinneberg et al. | 428/461 |
| 4,880,904 | 11/1989 | Kinneberg et al. | 528/392 |
| 5,087,664 | 2/1992 | Sugino et al. | 525/124 |
| 5,109,047 | 4/1992 | Aaronson et al. | 524/357 |

FOREIGN PATENT DOCUMENTS 2433722 1/1976 Fed. Rep. of Germany ...... 525/185

*Primary Examiner*—Jenna L. Davis
*Assistant Examiner*—Blaine Copenheaver
*Attorney, Agent, or Firm*—Richard P. Fennelly; Louis A. Morris

[57] ABSTRACT

Coated fabrics, for example, are disclosed comprising an open weave substrate (e.g., of polyester resin) coated with an adhesion promoting film comprising a vinyl chloride polymer and a carbon monoxide-propylene copolymer (e.g., having a molecular weight of from about 400 to about 1,000).

8 Claims, No Drawings

SUBSTRATE WITH ADHESION PROMOTING FILM COMPRISING VINYL CHLORIDE POLYMER PLASTICIZED WITH POLYKETONE

This is a continuation-in-part of U.S. Ser. No. 595,060, filed Oct. 10, 1990 now U.S. Pat. No. 5,109,047..

BACKGROUND OF THE INVENTION

It is known to coat substrates, e.g., an open weave substrate, e.g., one formed of polyester, polyamide, or a combination thereof, with a plasticized vinyl chloride polymer to form a coated fabric which can be used as single-ply roofing, in air ducts, as a pond liner, as a tarpaulin, as a mining belt, and the like. In order to enhance the adhesion of the coating of plasticized vinyl to the chosen substrate, it has been proposed to use, as an adhesive, a prepolymer containing at least 2% of isocyanate groups (e.g., U.S. Pat. No. 4,806,414). This approach has been criticized, for example, as posing a potential health danger to persons coming in contact with the adhesive (see U.S. Pat. No. 4,806,414 at Col. 1, lines 35–39).

Various disclosures exist in the prior art dealing with polyketone adhesives. U.S. Pat. No. 3,808,288 describes a pressure sensitive adhesive containing an epichlorohydrin polymer and a selected polyketone resin which is described as being the condensation polymer of one or more types of ketone with a lower aliphatic aldehyde. This composition can be used to form a pressure sensitive adhesive on a number of flexible backings (see Col. 2, lines 24–40).

More recent patents have indicated that the above type of polyketone-containing adhesive is deficient in a number of aspects (e.g., see Col. 2, lines 34–43 of U.S. Pat. No. 4,871,618 and Col. 2, lines 36–45 of U.S. Pat. No. 4,880,904) and have suggested use of certain polyketone structural adhesives for certain end uses. These adhesives are hot melt adhesives intended to be used on such substrates as aluminum, mild steel, cold rolled steel, resin coated steel, and on polymer substrates.

DESCRIPTION OF RELATED APPLICATIONS

Recently, it has been found that a carbon monoxide-propylene copolymer, preferably in liquid form, can effectively plasticize a vinyl chloride polymer (see U.S. Pat. No. 5,109,047, which is incorporated herein by reference). A preferred copolymer of this type is formed by polymerizing the carbon monoxide and propylene in an essentially ketone solvent to form a product substantially free of carboxylic ester and ether linkages or, if carboxylic acid end groups are desired, conducting the polymerization in a ketone/water solvent medium (see U.S. Pat. No. 5,270,441, which is also incorporated herein by reference).

SUMMARY OF THE INVENTION

The present invention relates to a laminate of substrate, such as an open weave substrate, and an adhesion promoting film which, preferably, is prepared via the plastisol method comprising mixing a dispersion grade vinyl chloride polymer which has been plasticized with a liquid carbon monoxide-propylene copolymer. The aforementioned construction is useful, for example, as a coated fabric for a variety of end-uses as mentioned above.

DETAILED DESCRIPTION OF THE INVENTION

The preferred open weave substrate which can be used herein is known to persons of ordinary skill in the art and includes open weave fabrics formed of such polymers as the polyesters (e.g., polyethylene terephthalate or polybutylene terephthalate), the polyamides (e.g., nylon 6, nylon 66, nylon 12). However, the present invention is also applicable to bonding other substrates to one another. Examples 3–4 show use of the invention with polyester films. The subcombination of such laminates (i.e., a coated substrate, such as a coated film, yarn, open weave fabric, metals (such as copper or aluminum, which might be useful as a substrate in coil coating applications), and the like) is also an important aspect of the invention. Such a combination comprises: (a) the desired substrate; and (b) the film of vinyl chloride polymer and carbon monoxide propylene polyketone plasticizer. The film (b) allows for the lamination of (a) and (b) to other structures.

The vinyl chloride polymer which forms the major component (e.g., from about 30 wt % to about 70 wt %) of the adhesion promoting film can be selected from known homopolymers of vinyl chloride monomer or known copolymers of vinyl chloride monomer with one or more ethylenically unsaturated monomers. Either suspension or emulsion grade vinyl chloride polymer resin can be chosen for use depending upon the method of fabrication chosen.

The carbon monoxide-propylene copolymer (or polyketone) which functions as a plasticizer (at from about 70% to about 30%, of the blend of polymer and polyketone), for the aforementioned vinyl chloride polymer in the adhesion promoting film used herein can have a molecular weight of from about 400 to about 10,000 depending upon whether the adhesion promoting film is to be prepared by either the calendering/extrusion method or by the plastisol method. In the former case, the molecular weight can range from about 1,000 to about 10,000 so that the blend of carbon monoxide-propylene polyketone and vinyl chloride polymer is a very viscous fluid to viscous semi-solid. If a more fluid plastisol is desired, the molecular weight will be from about 400 to about 1,000 so that a fluid to viscous fluid is produced with a viscosity of from about 300 to about 50,000 cps.

If desired, in a preferred embodiment, an optional top coat of an acrylic polymer can be applied to one or both sides of the coated fabric-adhesion promoting film structure, but this is not necessary. Such a top coat is routinely applied, for health and safety reasons, to coated fabrics which contain an isocyanate-containing binder in addition to conventional films of plasticized vinyl chloride polymer and open weave fabric.

The following Examples further illustrate the invention.

EXAMPLES 1-2

Two samples of a low molecular weight (about 500), liquid, copolymer of 50 mole % carbon monoxide and 50 mole % propylene, made by the process shown in U.S. Ser. No. 595,069, filed Oct. 10, 1990, which is incorporated herein by reference, were used in these Examples. The first copolymer (Sample A) was used as received, whereas the second (Sample B) was vacuum oven dried at 50° C. for sixteen hours at 30 inches of mercury.

The viscosity evaluation tests were performed (LVT, 12 rpm, spindle No. 4) on each sample with the viscosity values for Sample A being 21,900 cps and 22,100 cps, respectively, and the viscosity values for Sample B being 36,300 cps and 36,500 cps, respectively.

Plastisol formulations for each were fabricated as follows:

| Ingredient | Wt % | Weight (grams) A | B |
| --- | --- | --- | --- |
| PVC resin (GEON 121 brand) | 52.6 | 50 | 50 |
| Sample A | 20.0 | 19 | — |
| Sample B | 20.0 | — | 19 |
| Dioctyl phthalate (DOP) | 21.0 | 22.1 | 22.1 |
| Epoxidized soyabean oil | 5.0 | 5.3 | 5.3 |

The plastisol viscosities (LVT, 12 rpm, spindle No. 4) were 20,850 cps and 23,000 cps, respectively.

The extraction of dioctyl phthalate (DOP) plasticizer was measured on 6 mil films of the plastisol which had been fused for one minute at 190° C. The fused films were immersed for two hours in hexane at room temperature and extraction losses of 8.8% and 7.7% dioctyl phthalate (DOP) were observed.

Since the extraction losses determined above were less than expected, the extraction study was repeated with the following results being observed:

| Parameter Measured | Tie Coat* | A | B |
| --- | --- | --- | --- |
| Initial Weight (gm) | 0.73 | 0.75 | 0.83 |
| Weight After Extraction (gm) | 0.46 | 0.68 | 0.76 |
| Theoretical Loss of DOP (%) | 40.3 | 22 | 22 |
| Actual Loss (%) | 37 | 9.3 | 9.3 |

*commercial tie coat: 54% PVC; 40% diisononyl phthalate (DINP) plasticizer; 1.5% Intercide ABF arsenic-containing biocide; 3.0% filler; and 1.5% stabilizer.

The above experiment demonstrates the permanency of the carbon monoxide-propylene copolymer as a plasticizer. The carbon monoxide-propylene copolymer appears to retard the extraction of phthalate plasticizer from the film coating by hexane.

EXAMPLE 3

In this Example the low molecular weight carbon monoxide/propylene copolymer of Example 1 (Sample A) was used as a plasticizer in the following formulation:

| Ingredient | Parts by Weight (grams) |
| --- | --- |
| PVC Resin (GEON 102 EP) | 32 |
| CO/Propylene Copolymer | 20 |
| Tin mercaptide stabilizer | 1.0 |
| Phosphite heat stabilizer (SYNPRON 1535) | 0.2 |
| Epoxidized soyabean oil | 3.0 |

The following Brabender viscosity data (LVT Spindle No. 4, 60 rpm) was observed:

| Time (min) | Temp. (°C.) | Torque |
| --- | --- | --- |
| 0 | 160 | — |
| 2 | 148 | 2000 |
| 4 | 162 | 1320 |
| 6 | 163 | 1245 |
| 10 | 161 | 1200 |

At 23° C. the following data had also been generated for the copolymer itself:

| RPM | Viscosity (cps) |
| --- | --- |
| 12 | 4600 |
| 30 | 4600 |
| 60 | 4550/4640 |

After ten minutes, a 20 ml film derived from the plasticized formulation was pressed between polyester (Mylar brand) sheets at 400° F. The material processed very well with no sticking. A slight yellow color was noted. Otherwise, the laminate was optically very clear.

After two months storage, the film remained very glossy and dry and had no signs of plasticizer exudation.

EXAMPLE 4

This Example demonstrates the use of the plastisol method to laminate films of polyester (Mylar brand). The following plastisol formulation was made:

| Ingredient | Percentage by Weight (grams) |
| --- | --- |
| PVC Resin (GEON 121) | 42 |
| CO/Propylene Copolymer | 50 |
| Tin mercaptide | 3 |
| Epoxidized soyabean oil | 5 |

The above formulation was coated (about 6 mils) on top of a polyester film and was then fused at 180° C. for fifteen minutes. The adhesion of the fused film to the polyester was good. Then, another polyester film was placed on top of the fused film in the previously formed polyester/film laminate followed by compression molding at 180°/190° C. for five minutes. The adhesion of the fused film to both polyester films was good.

EXAMPLE 5

In this Example the adhesive properties of a plastisol containing the low molecular weight copolymer of carbon monoxide and propylene to open weave fabrics formed of Diolen brand polyester was tested. The following plastisol formulations were made:

| Ingredient | SAMPLE A | SAMPLE B |
| --- | --- | --- |
| PVC Resin (GEON 121) | 30 g | 30 g |
| Dioctyl Phthalate | 13 g | 22 g |
| CO/Propylene Copolymer | 9 g | 0 g |
| Barium/Cadmium Stabilizer | 0.9 g | 0.9 g |
| CaCO₃ Filler | 3 g | 3 g |
| Titanium Dioxide | 0.6 g | 0.6 g |

The ingredients in the above-described formulations were mixed together in separate 4 ounce glass jars and then passed through a laboratory two roll mill until a homogeneous plastisol was formed. The two plastisol formulations were then each coated onto two polyethylene terephthalate open weave fabrics in a two inch wide and three mil thick film. The plastisol coatings were pregelled at 150° C. for two minutes. After cooling of the gelled plastisol films, the facing plastisol surfaces of the two respective plastisol/fabric laminates for each formulation A and B were contacted to each other (or "kissed") to form a laminate comprising two final laminated fabrics with an intermediate layer of gelled plastisol between the fabrics. The two final laminates were placed in a compression press under 6,000 pounds per square inch pressure and were heated for two minutes at 190° C.

The resulting two plastisol bonded fabrics were submitted for a 180° peel test on an INSTRON peel tester (crosshead speed=100 mm/minute; gauge distance=100 mm; and grip distance=100 mm). The following average peel strengths were recorded: Sample B (the control containing dioctyl phthalate)=0.79 N/mm:; and Sample A (the present invention)=1.13 N/mm. The data showed an enhancement of about 43% above the control value.

The foregoing Examples should not be construed in a limiting sense since they are intended to merely illustrate certain aspects of the present invention. The scope of protection sought is set forth in the claims which follow.

We claim:

1. An article of manufacture comprising:
   (a) a substrate selected from the group consisting of polymer films, yarns, open weave fabrics, and metals; and
   (b) an adhesion promoting, fused film comprising a vinyl chloride polymer and a liquid carbon monoxide-propylene polyketone as a plasticizer thereof on the substrate.

2. An article as claimed in claim 1 wherein the polyketone has a molecular weight of from about 1,000 to about 10,000.

3. An article as claimed in claim 1 wherein the polyketone has a molecular weight of from about 400 to about 1,000.

4. An article as claimed in claim 1 wherein the substrate comprises polyester resin and the polyketone has a molecular weight of from about 400 to about 1,000.

5. An article as claimed in claim 1 wherein the vinyl chloride polymer is present at from about 30 wt % to about 70 wt % of the adhesion promoting film.

6. An article as claimed in claim 2 wherein the vinyl chloride polymer is present at from about 30 wt % to about 70 wt % of the adhesion promoting film.

7. An article as claimed in claim 3 wherein the vinyl chloride polymer is present at from about 30 wt % to about 70 wt % of the adhesion promoting film.

8. An article as claimed in claim 4 wherein the vinyl chloride polymer is present at from about 30 wt % to about 70 wt % of the adhesion promoting film.

* * * * *